US010235965B2

(12) United States Patent
Horneff et al.

(10) Patent No.: US 10,235,965 B2
(45) Date of Patent: Mar. 19, 2019

(54) VIRTUAL REALITY SYSTEM USING AN ACTOR AND DIRECTOR MODEL

(71) Applicant: Kuato Games (UK) Limited, London (GB)

(72) Inventors: Mark Horneff, London (GB); Chris Liu, Melbourne (AU); Kris Turvey, London (GB); Scott Lamb, Enfield (GB); Richard Winter, London (GB)

(73) Assignee: Kuato Games (UK) Limited, London (GB)

(*) Notice: Subject to any disclaimer, the term of this patent is extended or adjusted under 35 U.S.C. 154(b) by 0 days.

(21) Appl. No.: 15/460,184

(22) Filed: Mar. 15, 2017

(65) Prior Publication Data
US 2018/0268775 A1 Sep. 20, 2018

(51) Int. Cl.
| G09G 5/00 | (2006.01) |
| A63F 13/53 | (2014.01) |
| A63F 13/60 | (2014.01) |
| A63F 13/5255 | (2014.01) |
| A63F 13/86 | (2014.01) |

(Continued)

(52) U.S. Cl.
CPC ........... *G09G 5/006* (2013.01); *A63F 13/335* (2014.09); *A63F 13/5255* (2014.09); *A63F 13/53* (2014.09); *A63F 13/533* (2014.09); *A63F 13/60* (2014.09); *A63F 13/86* (2014.09); *A63F 2300/303* (2013.01); *G06T 19/006* (2013.01)

(58) Field of Classification Search
None
See application file for complete search history.

(56) References Cited

U.S. PATENT DOCUMENTS

| 6,425,764 B1 | 7/2002 | Lamson |
| 9,066,048 B2 | 6/2015 | Hoffert et al. |

(Continued)

FOREIGN PATENT DOCUMENTS

WO WO2016/053906 A1 4/2016

OTHER PUBLICATIONS

Kuato Games Limited, International Search Report and Written Opinion, PCT/IB2018/000327, dated Jun. 11, 2018, 13 pgs.

(Continued)

*Primary Examiner* — Ryan M Gray
(74) *Attorney, Agent, or Firm* — Morgan, Lewis & Bockius LLP

(57) ABSTRACT

A method for interacting with a virtual game environment in an actor/director model is performed on a first computing device in an actor mode of operation and a second computing device in a director mode of operation. Both devices display the shared virtual environment. The second device pairs with the first device and synchronizes with the virtual environment of the first device during the pairing. After the pairing, the first device receives a message from the second device to request a change in the virtual environment. The first device implements the requested change and transmits changes including the requested change to the second device. The second device displays the virtual environment and additional controls. After pairing, responsive to receiving a user input on a control of an element in the virtual environment, the second device generates and transmits a message to the first device to request the element change.

16 Claims, 11 Drawing Sheets

(51) Int. Cl.
*A63F 13/533* (2014.01)
*A63F 13/335* (2014.01)
*G06T 19/00* (2011.01)

(56) References Cited

U.S. PATENT DOCUMENTS

| | | | |
|---|---|---|---|
| 9,530,326 B1 | 12/2016 | Ramloll | |
| 2007/0117617 A1* | 5/2007 | Spanton | A63F 13/12 463/29 |
| 2009/0175559 A1 | 7/2009 | Hamilton et al. | |
| 2012/0299827 A1* | 11/2012 | Osborn | G09G 5/08 345/158 |
| 2014/0032635 A1 | 1/2014 | Pimmel et al. | |
| 2014/0128161 A1* | 5/2014 | Latta | A63F 13/06 463/42 |
| 2014/0186801 A1 | 7/2014 | Slayton et al. | |
| 2015/0279081 A1 | 10/2015 | Monk | |
| 2016/0101360 A1* | 4/2016 | Yan | H04L 67/38 463/29 |

OTHER PUBLICATIONS

Sharma Sharad et al., "Multi-user VR Classroom with 3D Interaction and Real-Time Motion Detection," 2014 International Conference on Computational Science and Computational Intelligence, IEEE, vol. 2, Mar. 10, 2014, 6 pgs.
Star Trek: Bridge Crew, Game Demo, Oct. 25, 2016, available at https://www.youtube.com/watch?v=18wxczcLaQE, 1 pg.

\* cited by examiner

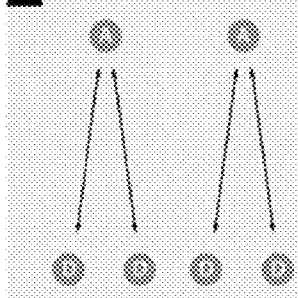 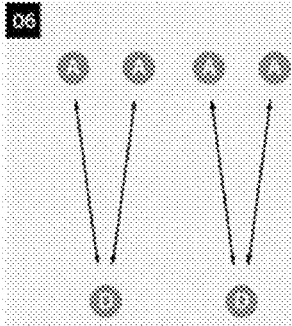 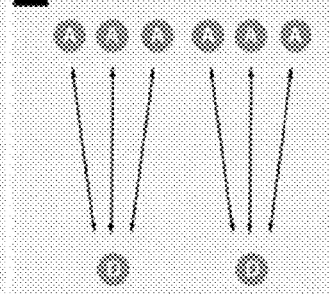
FIGURE 1F　　FIGURE 1G　　FIGURE 1H
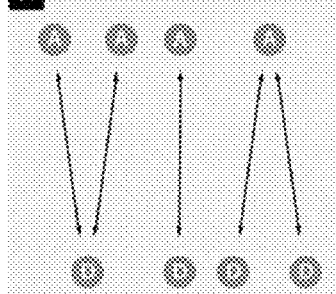
FIGURE 1I

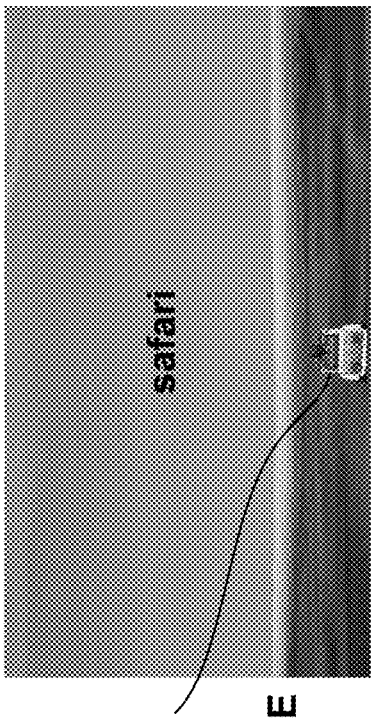
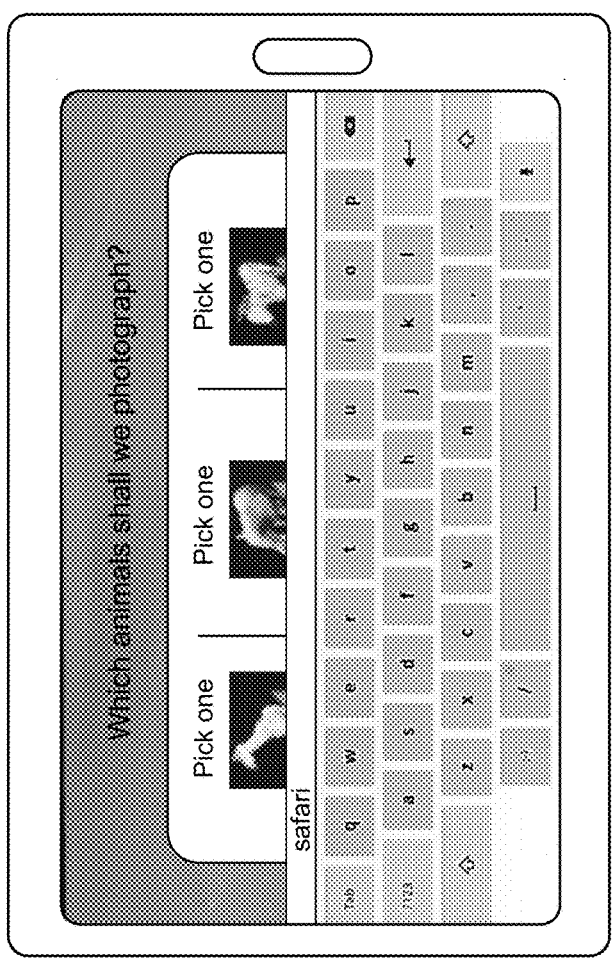
Figure 5D
Figure 5E

VIRTUAL REALITY SYSTEM USING AN ACTOR AND DIRECTOR MODEL

TECHNICAL FIELD

Some embodiments of the invention relate generally to virtual reality devices and systems, and more specifically to controlling and interacting with elements in virtual environments.

BACKGROUND

Conventional virtual reality (VR) head mounted displays (HMDs) often enclose the eyes and have miniature displays, such that any viewer nearby cannot see what a player with an HMD is seeing. This is frustrating for any interested third party who is present during gameplay, particularly when the player is a child and the observer is a parent, teacher, or caregiver. Using conventional VR systems, these third parties find themselves almost entirely "shut out" of the experience and unable to help and/or guide the player manipulating elements in the VR environment, even when the player experiences difficulties.

In a more traditional VR setup, there is simply one player with an HMD, interacting with a virtual game universe. Beyond this, it is possible to play networked games in VR, in which all players wear HMDs and share the same game space. However, such multiplayer setups are expensive and unlikely to be accessible to most people.

SUMMARY

Implementations disclosed herein address the above deficiencies and other problems associated present day virtual reality (VR) systems and methods. As used herein, VR is the computer-generated simulation of a three-dimensional (3D) environment that can be interacted with in a seemingly real way by a person using special electronic equipment, such as a helmet or goggles with a screen inside an/or gloves fitted with sensors.

In an actor/director model for VR, a network session is established among a number of players, including at least one Actor and at least one Director. As used herein, an "Actor" is a person, while wearing a VR headset, moves around and interacts with elements in a 3D VR environment. In other words, an Actor is a player wearing a VR rig, in traditional control of the game by moving an avatar around and interacting with the world. A "Director" is a person, who is able to watch and interact with the Actor's experience via a secondary device (e.g., a tablet or PC). In other words, the Director has an interactive observer role, seeing what the Actor sees. The Director can communicate with the Actor and interact with the game world that the Actor sees.

In the actor/director model, all of the players see the same events and details of the shared game world. The Actor may be thought of as a 1st-person explorer of the VR world, broadly in control of his experience, represented in the world with an avatar of some sort, and able to move and control the avatar by head movement (and/or using other peripherals, such as pointing devices or a joystick). As in typical VR, when the Actor looks around by physically turning his head, his view changes accordingly, as in the real world. Relative to the Actor, the Director is thought of as a secondary role such that the Director will be able to see whatever the Actor can see. The Director's device mirrors the Actor's device, which is in control of the VR world. For example, as the Actor turns his head, the Director will see what the Actor is looking at and may infer where his attention is being led. Upon seeing the scene and making the inference, the Director can interact with elements in the VR environment that may be of interest to the Actor. This is particularly useful for teachers, schools, and/or parents, who would like to provide educational guidance and value to a learner in order to stimulate and/or encourage learning. Systems and methods in accordance with implementations described herein thus overcome problems associated with the present-day VR systems in a simple and cost-effective manner.

In accordance with some implementations, a computing system is provided that includes a first device and a second device. The first device, which is placed in an actor mode of operation, includes a first display, one or more first processors, and first memory storing one or more first programs configured for execution by the one or more first processors. The first device displays on the first display a virtual game environment shared with the second device placed in a director mode of operation. The second device pairs with the first device and synchronizes the virtual game environment during the pairing. After pairing with the first device, the second device synchronizes the virtual game environment on the second device with that of the first device. In some instances, the first device receives a message from the second device requesting a change of an element in the virtual game environment. The first device accepts the change request and implements the change to the element. The first device then synchronizes the changes by transmitting the changes in the virtual game environment (including the element change) to the second device.

The second device, which is placed in the director mode of operation, includes a second display, one or more second processors, and second memory storing one or more second programs configured for execution by the one or more second processors. The system pairs the second device with the first device that is in the actor mode of operation. The second device displays on the second display the virtual game environment and additional controls to configure the virtual game environment. The second device further receives, by the second display, a second user input from a second user of the second device on one of the additional controls to change an element within the virtual game environment. The second device then generates and transmits the message requesting the change of the element from the second device to the first device.

In some implementations, the first device includes a plurality of devices.

In some implementations, the first device is a head mounted display (HMD).

In some implementations, the second device includes a plurality of devices. In some implementations, a different view of the virtual game environment is displayed on each of the plurality of devices.

In some implementations, prior to the pairing, the first device and the second device independently load static features of the virtual game environment.

In some implementations, the pairing of the first and second devices includes displaying a first code on the first display to the first user, receiving from the second user a second code on the second device, and comparing the first code with the second code. When the first code matches the second code, the process establishes a direct communication between the second device and the first device. In some implementations, the first code is a unique code generated by the first device, and the comparison is performed on the first device after the first device receives the second code from the second device. In some implementations, the first code is a unique code generated by the second device and transmitted to the first device for display, and the comparison is performed on the second device after receiving the second code from the second user.

In some implementations, synchronizing the virtual game environment on the second device with the first device includes a set of steps performed at the first device and a set of steps performed at the second device. The set of steps performed at the first device includes identifying a first element in the virtual game environment to be synchronized and a second element in the virtual game environment to be synthesized. The set of steps performed at the first device further includes, detecting a first change to the first element. In response to detecting the first change of the first element, the set of steps performed at the first device includes transmitting the first change from the first device to the second device without transmitting any changes to the second element. The set of steps performed at the second device includes receiving the first change of the first element from the first device. In response to receiving the first change of the first element from the first device, the set of steps performed at the second device further includes deriving a camera view of the first user based on the first change. In some implementations, the deriving includes updating the first element in accordance with the first change received from the first device, and computing the second element locally based on the first change of the first element. In some implementations, the first element corresponds to a position of the first user and/or a view direction of the first user. In some implementations, the first element is stored on the first device and the first change is detected by the first device. In some implementations, updating the first element in accordance with the first change received from the first device includes obtaining a view direction of the first user from the first device, and modifying the camera view by the first user's view direction. In some implementations, deriving the camera view of the first user based on the first change includes fading out the camera view and fading in a new camera view reflecting the changes received by the first device.

In some implementations, a non-transitory computer readable storage medium is provided. The computer readable storage medium stores one or more programs configured for execution by a first device in an actor mode of operation and a second device in a director mode of operation. The first device has a first display, one or more first processors, and first memory. The second device has a second display, one or more second processors, and second memory. The programs are configured to, at the first device, display on the first display a virtual game environment shared with the second device, pair with the second device, and synchronize the virtual game environment during the pairing. After pairing with the second device, the programs are further configured to, at the first device, synchronize the virtual game environment on the first device to the second device. In some implementations, the synchronizing includes receiving a message from the second device requesting a change of an element in the virtual game environment. In response, the first device accepts the change request and implements the change to the element in the virtual game environment. The first device transmits changes in the virtual game environment, including the element change, to the second device. The programs are further configured to pair the second device with the first device that is in the actor mode of operation. The programs are further configured to, at the second device, display on the second display the virtual game environment and additional controls to configure the virtual game environment. The programs are further configured to, at the second device, receive, by the second display, a second user input from a second user of the second device on one of the additional controls to change the element in the virtual game environment. The programs are then configured to, at the second device, generate and transmit the message requesting the change of the element from the second device to the first device.

In accordance with some implementations, a method is provided for interacting with a virtual game environment using an actor/director model. The method is performed at a first device in an actor mode of operation having a first display, one or more first processors, and first memory storing one or more first programs configured for execution by the one or more first processors and at a second device in a director mode of operation having a second display, one or more second processors and second memory storing one or more second programs configured for execution by the one or more second processors. The first device displays on the first display the virtual game environment shared with the second device, pairs with the second device, and synchronizes the virtual game environment during the pairing. After pairing with the first device, the second device synchronizes the virtual game environment on the second device with the first device. In some instances, the first device receives a message from the second device requesting a change of an element in the virtual game environment. In response to receiving the request, the first device accepts the request and implements the requested change to the element in the virtual game environment. The first device transmits changes in the virtual game environment, including the element change, to the second device. The second device is paired with the first device that is in the actor mode of operation, where the first device shares the virtual game environment with the second device. The second device then displays on the second display the virtual game environment and additional controls to configure the virtual game environment. The second device further receives, by the second display, a second user input from a second user of the second device on one of the additional controls to change the element in the virtual game environment. The second device then generates and transmits the message requesting the change of the element from the second device to the first device.

In some implementations, a non-transitory computer readable storage medium is provided that stores one or more programs. The one or more programs include instructions for performing any of the method steps above.

In some implementations, a system is provided that performs any of the method steps listed above.

In some implementations, an Actor using the software while wearing a VR headset, moves around and interacts with a 3D world, and a Director is able to watch and interact with the Actor's experience via a secondary device, e.g., a tablet or PC. This takes place using a network session between the players, which ensures they all see the same events and details of the shared game world. The effect of being in the same game world is achieved by maintaining synchronization of the state of the features which may change, e.g., Has a catapult fired? Are you being followed by a monster? What is the current score? Things that do not change (such as the landscape or rock formation) need not be synchronized and transmitted.

Resources that need to be synchronized are stored in a centralized location on the network, with one of the players acting as a server and holding a position of authority to make the state of the game universe. Particularly when both parties are very close to one another (as it is likely that a parent is supervising a child), using a peer-to-peer network, one or the other party can be both a player and the server for storing the state of the game and broadcasting the state. This configuration lowers network latency and gives a more satisfying game experience as the Director more quickly sees the result of changes in the Actor's world, and is not frustrated by perceptible "lag." The result is a quicker network transaction time, as party A sends directly to party B, and vice versa.

Thus the VR systems and methods in an actor/director model described herein allow efficient interaction with virtual game environment.

BRIEF DESCRIPTION OF THE DRAWINGS

For a better understanding of the aforementioned implementations of the invention as well as additional implementations thereof, reference should be made to the Description of Implementations below, in conjunction with the following drawings in which like reference numerals refer to corresponding parts throughout the figures.

FIGS. 1B-1I are block diagrams illustrating various actor/director models in accordance with some implementations.

FIGS. 5A-5G are screenshots from one implementation.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without these specific details.

DESCRIPTION OF IMPLEMENTATIONS

Figure 1A:
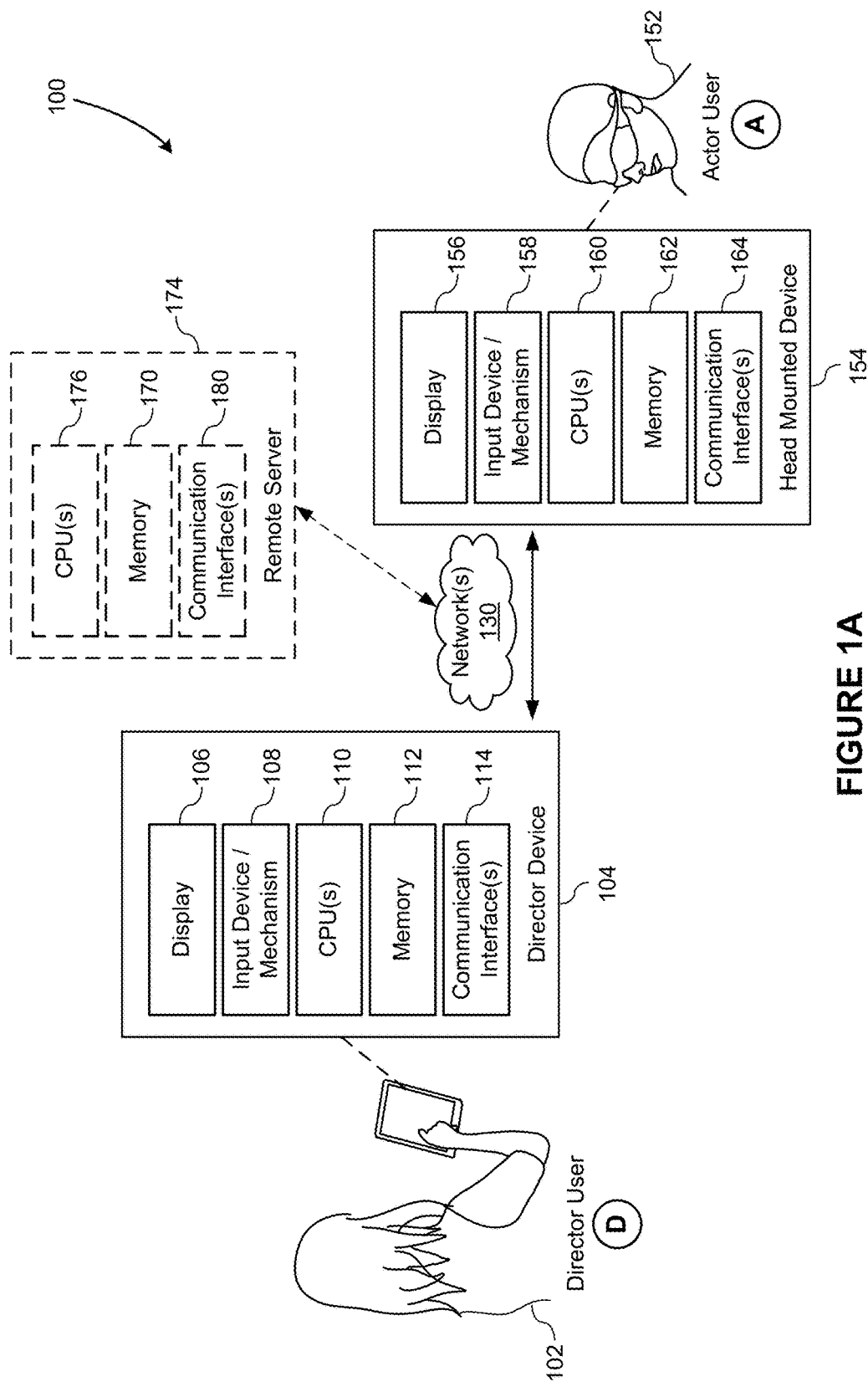
FIG. 1A is a block diagram illustrating a context in which some implementations operate.

FIG. 1A is a block diagram illustrating conceptually a context 100 in which some implementations operate. As illustrated, a Director user 102 interacts with a virtual game environment that is executed at a computing device 104 in a director mode of operation. The computing device 104 is also referred to as a director device, which may be a tablet computer, a laptop computer, a smart phone, a desktop computer, a PDA, or other computing device that can run a gaming application. In some implementations, the director device 104 includes a display 106, one or more input/output (I/O) devices or mechanisms 108, one or more processing units (CPUs) 110 for executing modules, programs, or instructions stored in memory 112, and one or more network or other communications interfaces 114, as described in greater detail below with reference to FIG. 3.

Also as illustrated in FIG. 1A, an Actor user 152 interacts with a virtual game environment that is executed at a computing device 154 in an actor mode of operation. The computing device 154 is also referred to as an actor device, which may be a head mounted display (HMD) in some implementations. The computing device 154 can run a gaming application and display the virtual game environment created by the gaming application locally on a display 156 of the device 154. In addition to the display 156, in some implementations, the actor device includes one or more I/O devices or mechanisms 158, one or more processing units (CPUs) 160 for executing modules, programs, or instructions stored in memory 162, and one or more network or other communications interfaces 164, as described in greater detail below with reference to FIG. 2.

In some implementations, as described in greater detail below with reference to FIGS. 1C-1I, the system 100 includes a separate computing device, e.g., a remote server 174. The remote server 174 also executes a virtual game environment. In some implementations, the server 174 may be a tablet computer, a laptop computer, a smart phone, a desktop computer, a PDA, or other computing device that can run a gaming application (e.g., the game application 222 server component, FIG. 2). In some implementations, the server 174 includes a display, one or more input/output (I/O) devices or mechanisms, one or more processing units (CPUs) 176 for executing modules, programs, or instructions stored in memory 170, and one or more network or other communications interfaces 180 to connect the remote server 174 to the network(s) 130.

During gameplay, when the players are in close proximity, multiple communication channels exist between the Actor 152 and the Director 102. The Director 102 may simply talk (verbally, without technology) to the Actor 152 and give advice to engender active discussion between the two. For example, the Director 102 passes information (or questions) to the Actor 152, to aid him in his exploration of the game space, and potentially to further any educational outcomes/goals. This active communication takes the game away from being a solo activity and bolsters the shared nature of the experience.

The Director 102 guides the Actor 152 not just by voice, but also by influencing and interacting with a shared online game space. The shared online virtual space is created by synchronizing between the director device 104 and the actor device 154. Using an on-screen user interface (UI) displayed on the display 106 of the director device 104, the Director user 102 can request to change the game environment, send visual hints or pointers (e.g., by selecting an object to highlight, or touching an area of the map), give textual information or updates, choose mission targets or destinations. In an even more proactive manner, the Director 102 may directly control interactive elements of the game world in order to challenge the Actor 152. The changes and control of interactive elements by the Director are communicated to the Actor 152 via the network(s) 130. Upon approval by the Actor's device, the changes are reflected in the virtual environment on the Actor device 154 and synchronized to the director device 104 via the network(s) 130. The synchronization of the state of the features in the virtual game environment provides the effect of all players being in the same game world.

Figure 1B:
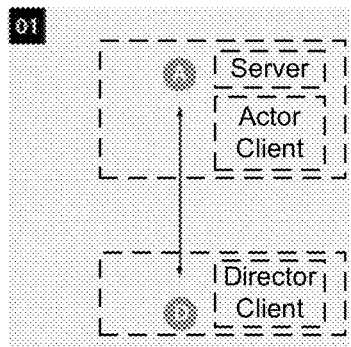

FIG. 1A illustrates a single Actor player paired with a single Director player. This is the simplest combination of the actor/director model, as shown in FIG. 1B. It is possible to vary the numbers of players in both roles and/or the relationship between these roles. FIGS. 1C-1I illustrate expanded connectivity of players in accordance with some implementations. In these actor/director models, the Director 152 can interact with the Actor 102 and game world in various ways, and various combinations of Directors and Actors may fit different styles of gaming and learning.

Figure 1C:
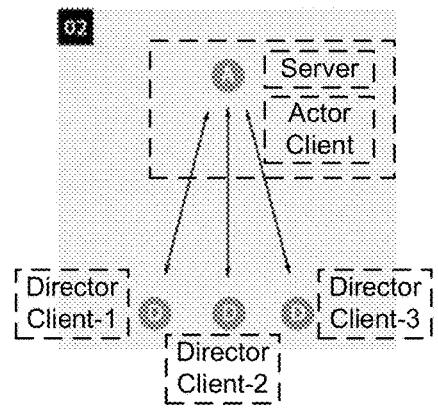

FIG. 1C illustrates an actor/director model involving one Actor and multiple Directors, e.g., several observing Directors interact with one Actor. An example of this sort of interaction is a physical game show, in which an inactive (but vocal) team of Directors advises an active teammate as an Actor in a series of tasks or challenges. Each Director sees either what the Actor sees and/or potentially has a different view of the play space (e.g., different perspectives revealing different aspects of the challenge).

Figure 1D:
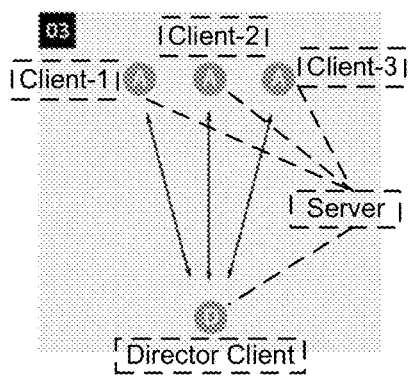

FIG. 1D illustrates an actor/director model involving one Director and multiple Actors. In this configuration, the one Director is able to see the views of several Actors at the same time. This resembles the interaction of a coordinator as the Director instructing a team, issuing commands, and having the Actors work in an effective way together in the shared environment. In some implementation, the Director has a single view that includes all of the actors. In other implementations, the director has a separate view corresponding to each of the Actors.

Figure 1E:
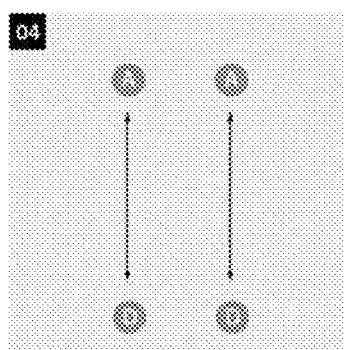

FIG. 1E illustrates an actor/director model that includes multiple Actors and Directors to form multiple teams. In the previous scenarios illustrated in FIGS. 1B-1D, though the number of players in the roles may vary, a single connected graph is maintained, that is, all the players are related to each other in some fashion. In FIG. 1E, though, groups, in which two or more pairs (or groups) exist, are disconnected from other groups, but share the same virtual world. In the example shown in FIG. 1E, two Actors, in competition with each other within the same environment. These Actors may be engaged in a treasure hunt, in which their attached Directors would assist them in solving clues and providing the direction in which to search next, with the players knowing that the other team has the same goal, racing to get there first. Though FIG. 1E shows only two teams, this can be extended to N teams, as far as network and device performance would allow.

FIGS. 1F-1H illustrate actor/director models that includes multiple complex teams of similar organization. For example, multiple teams of similar groups such as one Actor, two Directors (FIG. 1F, two explorers with a team of advisors each), one Director, two Actors (FIG. 1G, multiple groups in which one Director coordinates teams of Actors to explore/solve/battle etc.). Further, as shown in FIG. 1H, the actor/director ratio is not limited to 1:2 or 2:1. The actor/director relationship can be one-to-many in either direction, e.g., two coaches directing two whole teams of Actors playing football.

FIG. 1I illustrates an actor/director model that includes heterogeneous team structures. For instance, in a star ship simulator, numerous ships containing officers in the Director role communicate with crews on the planet surface in the Actor roles. These ships potentially compete or cooperate with each other. For example, three ships as shown in FIG. 1I race to a planet for a rescue mission. In this context, all players (Actors and Directors) already have some mechanism to enter the same game (e.g., a lobby, as typically used for many-player games).

In some implementations, during the gameplay, the relationship between Actors and Directors may be dynamic and fluid as the game's dynamic evolves. For example, on a starship, the Actors act as explorers and the Directors as coordinators. For one mission, one Director and two Actors form a group in which the Actors go to the planet to find an item. During this time, they act as a small 2:1 Actor:Director group, where the Director can see and coordinate both Actors. The other members of the group are otherwise engaged in different tasks/roles. Once the mission is complete, the original two Actors are detached from the group with the original Director within the game, and go away to perform different missions. Three new Actors are assigned to this Director, to take on another planet side mission, which proceeds in this new configuration. The actor/director pairing may be happening with numerous groupings being made and broken within the game fluidly over time and/or according to mission demands.

In some implementations, peer-to-peer network configuration of pairing an Actor device with a Director device may be used to lower the network latency. In more complex configurations, a more traditional star-topology may be adopted to easily facilitate these more complicated patterns. For example, in the simple combination shown in FIG. 1B, the actor device 154 runs both a server and a client to optimize the data transmission time between players. The client component on the actor device 154 is connected to the server component on the same actor device 154. As both components are running on the same actor device 154, the communication time is essentially instantaneous. All changes captured by the client device are sent to the server, then out to all clients, including both the client component on the actor device 154 and director device 104. As a result, the response time and the data routing resembles that of a peer-to-peer network. In more complex configurations, e.g., as shown in FIGS. 1C-1I, in some implementations, one player is the server, e.g., the actor device 154 as the server as shown in FIG. 1C. A different approach in the more complex configurations, in accordance with some implementations, is for the server to run on an independent computer, accessible from all players, as shown in FIG. 1D. The traffic is routed according to a star topology.

Figure 2:
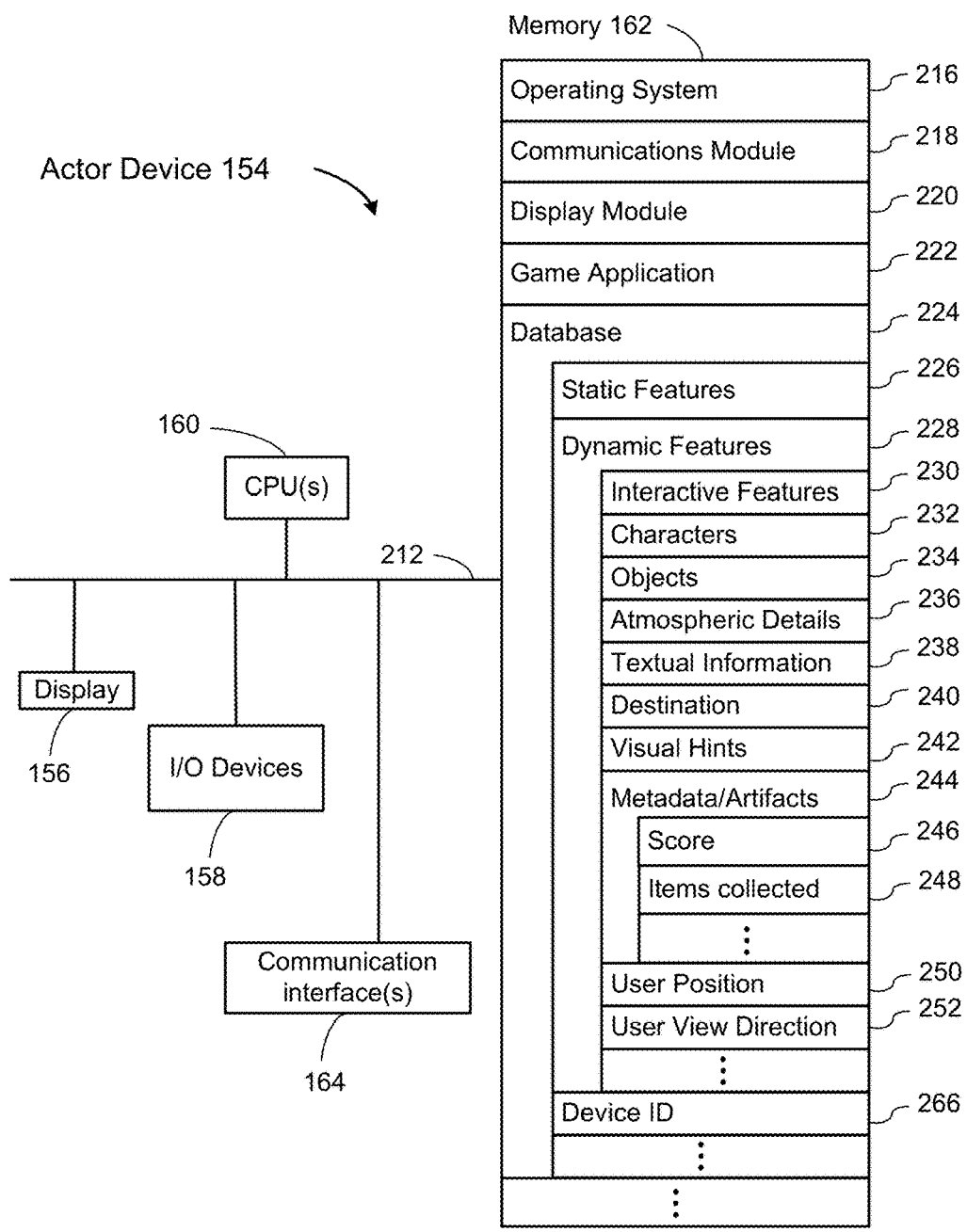
FIG. 2 is a block diagram of an actor computing device according to some implementations.

FIG. 2 is a block diagram illustrating the computing device 154, which the Actor user 152 uses to access a game application 222. The computing device 154 is also referred to as an actor device. In some implementations, the computing device 154 is a head mounted display (HMD) that encloses the eyes of the Actor 152 when the Actor 152 accesses the game environment. In some implementations, the computing device 154 may be a tablet computer, a laptop computer, a smart phone, a desktop computer, a PDA, or other computing device that can run the gaming application 222. The computing device 154 typically includes one or more processing units (CPUs) 160 for executing modules, programs, or instructions stored in memory 162 and thereby performing processing operations; one or more network or other communications interfaces 164; memory 162; and one or more communication buses 212 for interconnecting these components. The communication buses 212 may include circuitry (sometimes called a chipset) that interconnects and controls communications between system components. The computing device 154 further includes a display device 156 (e.g., a miniature display) and one or more I/O devices or mechanisms 158. In some implementations, the I/O devices 158 include a keyboard (virtual and/or physical), a button, a speaker, a microphone, voice activated controller, or touch sensitive surface.

In some implementations, the memory 162 includes high-speed random access memory, such as DRAM, SRAM, DDR RAM or other random access solid state memory devices. In some implementations, the includes non-volatile memory, such as one or more magnetic disk storage devices, optical disk storage devices, flash memory devices, or other non-volatile solid state storage devices. In some implementations, the memory 162 includes one or more storage devices remotely located from the CPU(s) 160. The memory 162, or alternately the non-volatile memory device(s) within the memory 162, comprises a non-transitory computer readable storage medium. In some implementations, the memory 162, or the computer readable storage medium of the memory 162, stores the following programs, modules, and data structures, or a subset thereof:

an operating system 216, which includes procedures for handling various basic system services and for performing hardware dependent tasks;

a communications module 218, which is used for connecting the computing device 154 to other computers and devices via the communication network interfaces 164 (wired or wireless) and one or more communication networks, such as the Internet, other wide area networks, local area networks, metropolitan area networks, and so on;

a display module 220, which receives input from the one or more I/O devices 108, and generates user interface elements for display on the display device 156;

a game application 222, which enables a user (e.g., the Actor user 152) to manipulate elements within a virtual environment provided by the game. For example, the game application 222 may provide a sequence of virtual scenes stored as static features 226. Within each scene, a non-player virtual character 232 (e.g., a giraffe) may interact with other virtual characters 232, or may interact with other virtual objects 234 (e.g., a giraffe eats tree leaves or a lion attacks the giraffe); and one or more databases 224, which store static features 226 and dynamic features 228;

similar to the static features 326, the static features 226 are unchanging features in the virtual reality game environment, stored in a definition of the game world, loaded independently by the actor device 154 for displayed, and not transmitted over the network 130;

the dynamic features 228 include interactive features 230 (e.g., questions posted by the Director 102 for the Actor 152 to answer and/or make selections), characters 232 (e.g., a rhino), virtual objects 234 (e.g, a tree), atmospheric details 236 (e.g., clouds, the sun, or the moon etc.), textual information 238 (e.g., a textbox containing information about rhino), one or more destinations 240, visual hints 242 (e.g., a clue), metadata and/or artifacts 244 such as one or more scores 246 and items collected 248 etc. In addition, dynamic features 228 also include user position 250 and user view direction 252 of the Actor 152. When the Actor 152 starts his game, these dynamic features 228 are retrieved from the database 224 and synchronized with the information stored in the database 324 of the director device 104, so that both the director device 104 and the actor device 154 are starting in the same state. During the gameplay, the dynamic features 328 are synchronized or synthesized so that the Director's display 106 tracks the Actor's view; and a device identifier (ID) 266 that uniquely identifies the actor device 154 for pairing of the actor device 154 with one or more director devices.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 162 may store a subset of the modules and data structures identified above. Furthermore, the memory 162 may store additional modules or data structures not described above.

Although FIG. 2 shows a computing device 154, FIG. 2 is intended more as a functional description of the various features that may be present rather than as a structural schematic of the implementations described herein. In practice, and as recognized by those of ordinary skill in the art, items shown separately could be combined and some items could be separated.

In some implementations, the data or executable programs illustrated in FIG. 2 for the game application may be shared between the computing device 154 and one or more devices and/or servers distinct from the computing device. One of skill in the art recognizes that various allocations of functionality between the computing device 154 and one or more devices and/or servers are possible, and some implementations support multiple configurations (e.g., based on user selection). For example, in some implementations, the virtual game environment is provided by software (e.g., the game application 222) running locally on the user's computing device 154. In some implementations, the virtual game environment is displayed locally on the user's computing device 154, but some of the software is running on a remote device (e.g., in the cloud or a separate computing device). For example, in some implementations, the software (e.g., the game application 222) runs both a server and a client on the actor device 154, as shown in FIGS. 1B and 1C; whereas in some implementations, the software (e.g., the game application 222) runs the client on the actor device 154 (e.g., client-1, client-2, and client-3 in FIG. 1D) and runs the server (e.g., the server 174 in FIG. 1A) on an independent computer, as shown in FIG. 1D.

Figure 3:
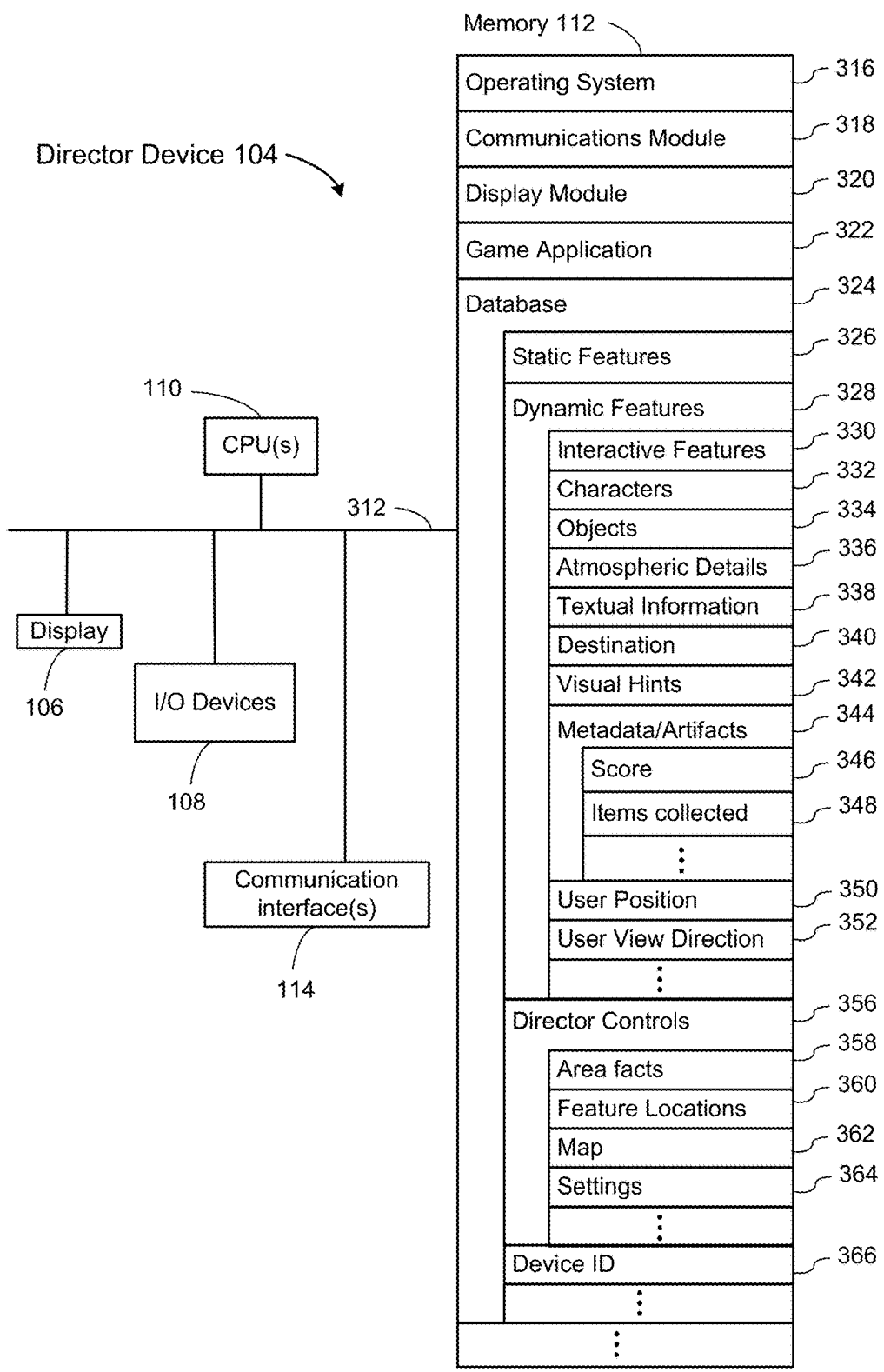
FIG. 3 is a block diagram of a director computing device according to some implementations.

FIG. 3 is a block diagram illustrating the computing device 104, which the Director user 102 uses to access a game application 322. The computing device 104 is also referred to as a director device, which may be a tablet computer, a laptop computer, a smart phone, a desktop computer, a PDA, or other computing device that can run the gaming application 322. The computing device 104 typically includes one or more processing units (CPUs) 110 for executing modules, programs, or instructions stored in memory 112 and thereby performing processing operations; one or more network or other communications interfaces 114; memory 112; and one or more communication buses 312 for interconnecting these components. The communication buses 312 may include circuitry (sometimes called a chipset) that interconnects and controls communications between system components. The computing device 104 further includes a display device 106 and one or more I/O devices or mechanisms 108. In some implementations, the I/O devices 108 include a keyboard, a mouse, a speaker, a microphone, a joystick, trackball, trackpad, voice activated controller, or touch sensitive surface.

In some implementations, the memory 112 includes high-speed random access memory, such as DRAM, SRAM, DDR RAM or other random access solid state memory devices. In some implementations, the includes non-volatile memory, such as one or more magnetic disk storage devices, optical disk storage devices, flash memory devices, or other non-volatile solid state storage devices. In some implementations, the memory 112 includes one or more storage devices remotely located from the CPU(s) 110. The memory 112, or alternately the non-volatile memory device(s) within the memory 112, comprises a non-transitory computer readable storage medium. In some implementations, the memory 112, or the computer readable storage medium of the memory 112, stores the following programs, modules, and data structures, or a subset thereof:

an operating system 316, which includes procedures for handling various basic system services and for performing hardware dependent tasks;

a communications module 318, which is used for connecting the computing device 104 to other computers and devices via the communication network interfaces 114 (wired or wireless) and one or more communication networks, such as the Internet, other wide area networks, local area networks, metropolitan area networks, and so on;

a display module 320, which receives input from the one or more I/O devices 108, and generates user interface elements for display on the display device 106;

a game application 322, which enables a user (e.g., the Director user 102) to manipulate elements within a virtual environment provided by the game. For example, the game application 322 may provide a sequence of virtual scenes stored as static features 326. Within each scene, a non-player virtual character 332 (e.g., a giraffe) may interact with other virtual characters 332, or may interact with other virtual objects 334 (e.g., a giraffe eats tree leaves or a lion attacks the giraffe); and one or more databases 324, which store static features 326, dynamic features 328, and director controls 356;

the static features 326 are unchanging features in the virtual reality game environment. When the Actor 152 and Director 102 start their games, both are presented with a 3D world, containing some static features 326, e.g., landscape or rock formation. The static features 326 can be defined ahead of time, loaded and modelled identically on both instances of the software. Since static features 326 do not change, they need not be synchronized and transmitted. These resources are stored in a definition of the game world that is loaded independently by both parties and displayed. Some implementations enable a user to create new landscape (e.g., a tide, the ground splitting in an earthquake) or to modify existing scenes. In such implementations, these features become dynamic and stored in dynamic features 328;

the dynamic features 328 include interactive features 330 (e.g., changing the environment or challenges to the Actor 152), characters 332 (e.g., a giraffe), virtual objects 334 (e.g, a tree), atmospheric details 336 (e.g., clouds), textual information 338 (e.g., a label), one or more destinations 340, visual hints 342 (e.g., a clue), metadata and/or artifacts 344, such as one or more scores 346 and items collected 348. When the Actor 152 and Director 102 start their games, these dynamic features 328 are retrieved from the database 324 and synchronized, so that both the director device 104 and the actor device 154 are starting in the same state. During the gameplay, the dynamic features 328 are synchronized or synthesized so that the Director's display 106 tracks the Actor's view. In particular, the dynamic features 328 include user position 350 and user view direction 352 of the Actor 152 that are received from the actor device 154 and synchronized during the gameplay. Other dynamic features 328 can be derived or computed locally based on the user position 350 and user view direction 352 in some implementations;

director controls 356 include facts 358 about the area or its inhabitants, the location 360 of interactive features 330, a full map 362 of the area, settings 364 from menu items only available to the Director 102, and so on. The director controls 356 are presented to the Director 102 but not the Actor 152. With the extra director controls 356, the Director 102 can post challenges and/or provide guidance to the Actor 152; and device identifiers (ID) 366 for pairing of the director device 104 with one or more actor devices.

Each of the above identified executable modules, applications, or sets of procedures may be stored in one or more of the previously mentioned memory devices and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 112 may store a subset of the modules and data structures identified above. Furthermore, the memory 112 may store additional modules or data structures not described above.

Although FIG. 3 shows a computing device 104, FIG. 3 is intended more as a functional description of the various features that may be present rather than as a structural schematic of the implementations described herein. In practice, and as recognized by those of ordinary skill in the art, items shown separately could be combined and some items could be separated.

In some implementations, the data or executable programs illustrated in FIG. 3 for the game application may be shared between the computing device 104 and one or more devices and/or servers distinct from the computing device. One of skill in the art recognizes that various allocations of functionality between the computing device 104 and one or more devices and/or servers are possible, and some implementations support multiple configurations (e.g., based on user selection). For example, in some implementations, the virtual game environment is provided by software (e.g., the game application 322) running locally on the user's computing device 104. In some implementations, the virtual game environment is displayed locally on the user's computing device 104, but some of the software is running on a remote device (e.g., in the cloud or a separate computing device, such as the remote server 174 in FIG. 1A).

Figure 4A:
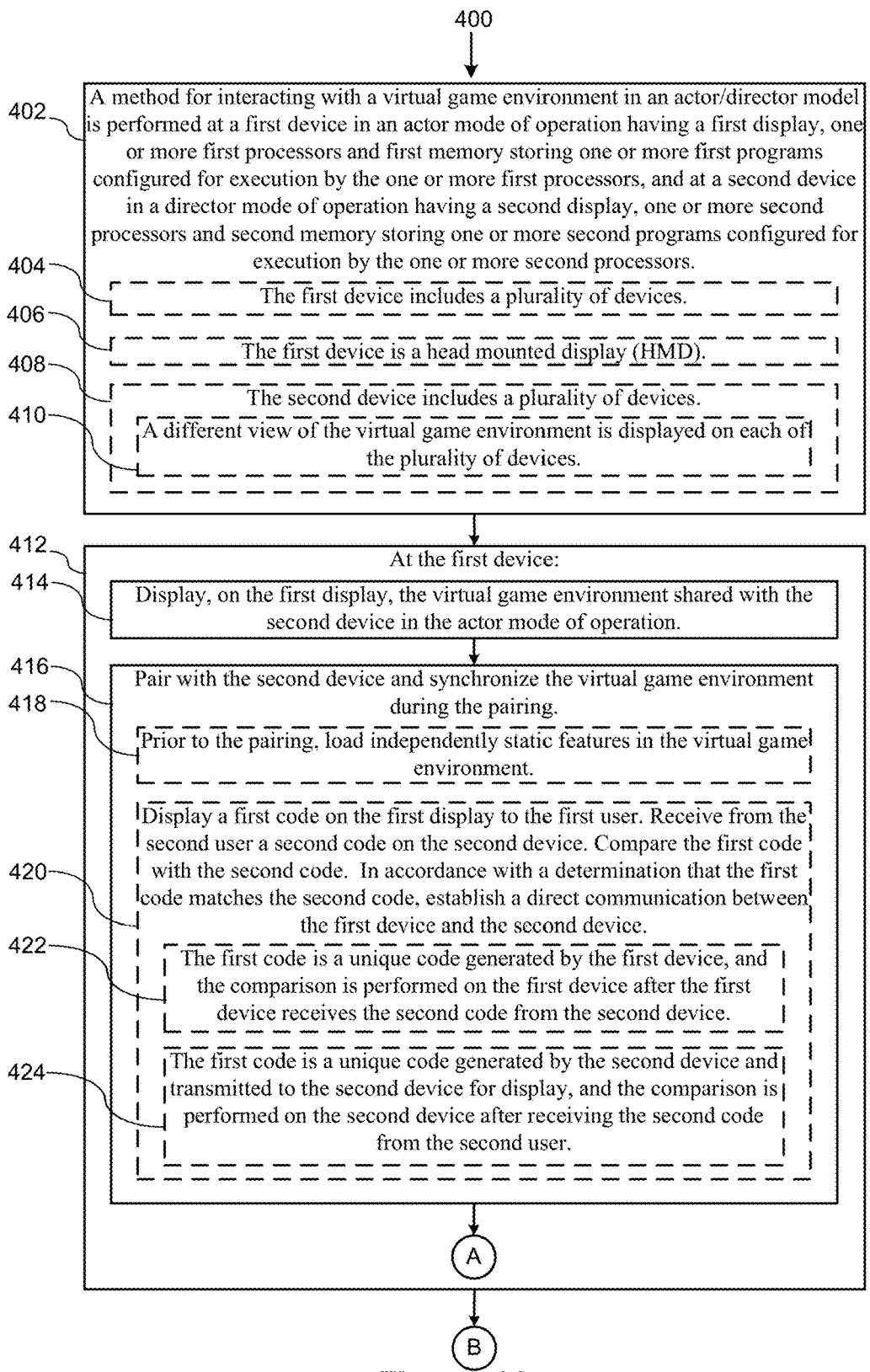
FIGS. 4A-4C provide a flowchart of a process, performed at a computing system, for interacting with a virtual reality environment according to some implementations.
Figure 4B:
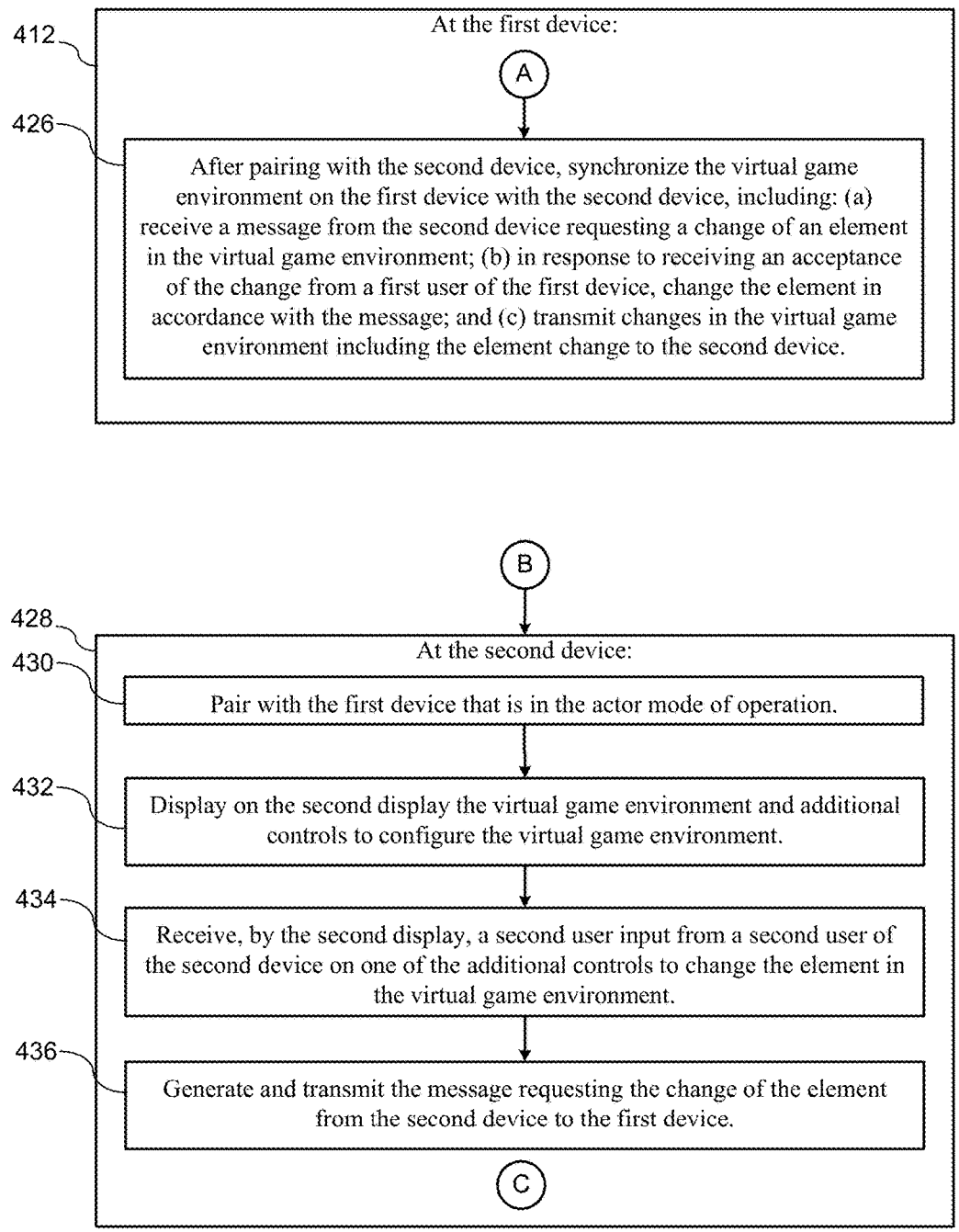
Figure 4C:
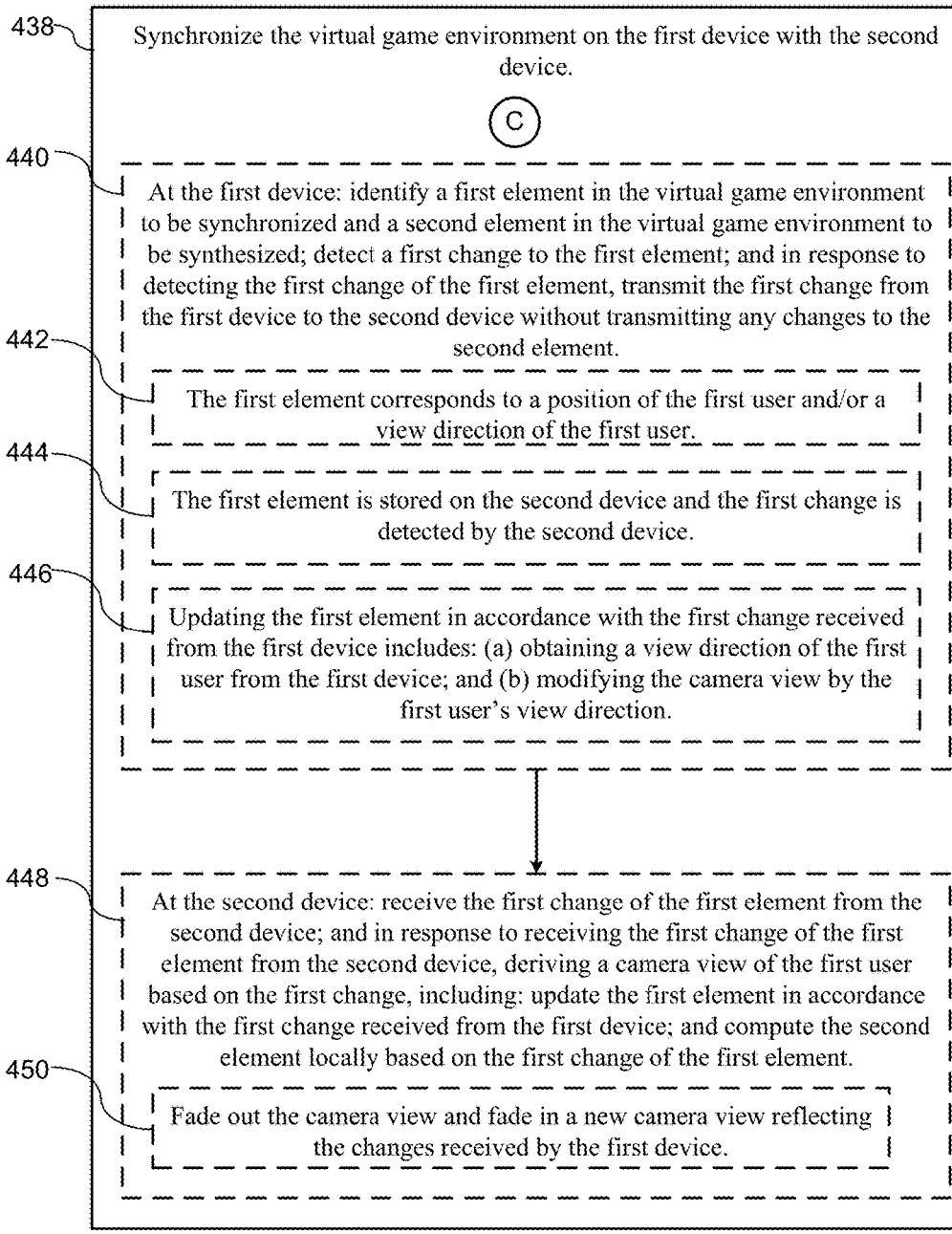

FIGS. 4A-4C provide a flowchart of a process 400 for interacting with a virtual game environment in an actor/director model according to some implementations. In a shared virtual game environment, the Director user 102 with a computing device 104 in the director mode of operation shadows the Actor user 152 with a different computing device 154 in the actor mode of operation. The Director 102, via the director device 104, sends messages to the actor device 154 to seek permission to change elements in the shared environment. The interactions by the Director 102 help the Actor 152 navigate through the game in an efficient manner. Example images of the interactions are shown in FIGS. 5A-5G.

The method is performed (402) at a first device (e.g., the actor device 154) in an actor mode of operation and at a second device (e.g., the director device 104) in a director mode of operation. The first device has a first display (e.g., the display 156), one or more first processors (e.g., the CPU(s) 160) and first memory (e.g., the memory 162) storing one or more first programs (e.g., the game application 222) configured for execution by the one or more first processors (e.g., the CPU(s) 160). The second device has a second display (e.g., the display 106), one or more second processors (e.g., the CPU(s) 110), second memory (e.g., the memory 112) storing one or more second programs (e.g., the game application 322) configured for execution by the one or more second processors (e.g., the CPU(s) 110).

In some implementations, the first device includes (404) a plurality of devices. In some implementations, the first device is (406) a head mounted display (HMD). When the Actors 152 move around wearing enclosed HMDs and interact with the 3D game world, the Director 102 can watch and interact with all Actors' experience via the director device 104. As explained above with reference to FIGS. 1D and 1I, in some implementations, one Director 102 can see the views of several Actors 152 at the same time, (e.g., resembling the interaction of a coordinator as the Director instructing a team), issuing commands, and having the Actors work in an effective way together in the shared environment. Systems and methods described herein thus overcome the isolation issue of conventional VR systems and methods, take the game away from being a solo activity, and bolster the shared nature of the experience.

In some implementations, the second device includes (408) a plurality of devices. In some implementations, a different view of the virtual game environment is displayed (410) on each of the plurality of devices. For example, as explained above with reference to FIGS. 1C, 1F, and 1I, an actor/director model can include one Actor and multiple Directors, e.g., several observing Directors interact with one Actor. Through the settings 364 configuration, one Director may filter out unwanted elements displayed in the shared game space and focus on seeing a subsection of the game space, while a different Director may see a different set of information, such as obtaining some sort of tactical or planning view. For example, while the Actor 152 is exploring a safari, different Directors 102 may focus on different aspects of safari. One Director 102 may have access to the local area map (e.g., stored in map 362). The Director 102 may then verbally communicate attractions in the area to the Actor 152 in close distance, and direct the Actor 152 towards one or more attractions in the virtual game environment. A different Director 102 may retrieve textual information (e.g., obtained from the textual information 338) about animal or plants and provide such information to the Actor 152.

Still referring to FIG. 4A, the method 400 further performs, at the first device (412), displaying (414) on the first display the virtual environment. The virtual environment is provided by the game application 222 and shared with the director device 104. For example, in FIG. 5B, when the Actor 152 starts the game, the content in the virtual environment on the actor device 154 (e.g., the safari landscape and the avatar 502) is defined ahead of time, loaded, and modelled independently of the instance of the game application 222. In some implementations, once the game starts on the actor device 154, the game application 222 runs on both a server component and a client component on the actor device 154. The first device further pairs (416) with the second device and synchronizes the virtual game environment on the first device during the pairing.

Figure 5A:
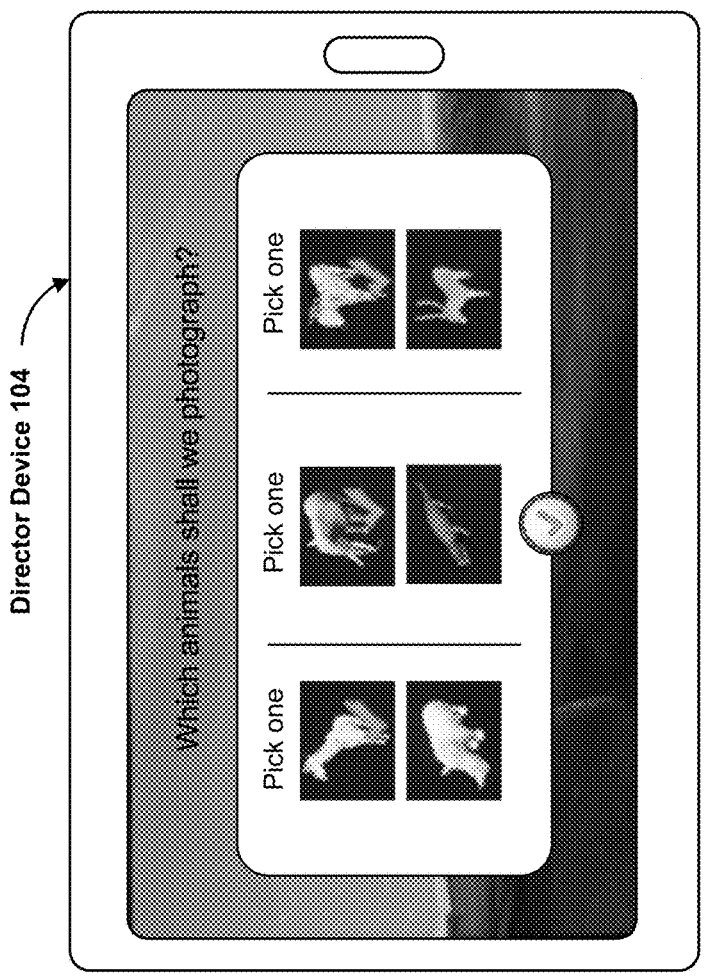
Figure 5B:
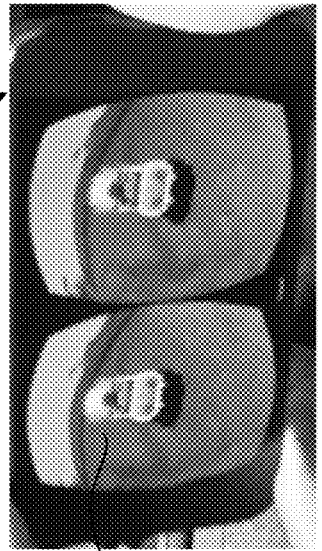
Figure 5C:
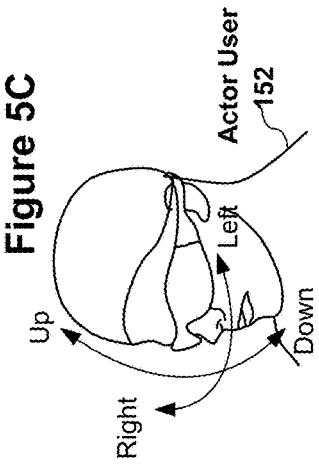

For example, in FIGS. 5A-5C, the director device 104 has a control setting UI that is only available to the Director 102. Through the UI, the Director 102 chooses which animals to photograph together with the Actor 152. The setting values are stored in the director controls 356 of the director device 104. During the pairing, the settings, e.g., pre-play configurations and/or direction commands, are retrieved from the director controls 356 and synchronized with the actor device. As show in FIG. 5F, the three animals chosen by the Director 102 are displayed in the photo list 504 on the director device 104 and the same three animals are displayed as indicators 554 on the actor device 154. Upon receipt of the pre-game configurations indicating the completion of pairing, the actor device moves into a play mode.

In some implementations, prior to the pairing of the first and second devices, the first and second devices independently load (418) static features in the virtual game environment. For example, as shown in FIGS. 5A-5C, when the Actor user 152 starts his or her game on the actor device 154, a safari landscape is loaded. The actor device 154 holds the initial and unchanging state of a safari landscape (e.g., stored in the static features 226 of the actor device 154). Likewise, a safari landscape is loaded on the director device 104. The static unchanging features do not require synchronization and are not transmitted over the network.

In some implementations, the pairing of the first and second device includes displaying (420) a first code on the first display to the first user, then receiving from the second user a second code on the second device, and then comparing the first code with the second code. In accordance with a determination that the first code matches the second code, the second device and the first device establish a direct communication. For example, in FIGS. 5D and 5E, assuming close proximity of players, the Actor 152 may see a short code of characters and/or numbers (e.g., "safari") on the display 156 of the HMD 154. The Actor 152 may tell the code to the Director 102.

In some implementations, the code is unique and is a way of identifying a particular Actor 152. If there are many such players on the same network as shown in FIG. 1D, 1G, 1H, or 1I, the codes can identify the individual actors. Using the unique code, the actor device 154 identifies itself in a unique fashion. Upon hearing the code, the Director 102 enters this code through the I/O devices 158, e.g., an onscreen virtual keyboard as shown in FIG. 5D. The director device 104 then compares the code received from the actor device 154 with the code entered by the director user 102. Upon finding a match, the system ascertains consent of the pair and the two devices 104 and 154 begin direct communication.

In some implementation, the first code is a unique code generated (422) by the first device, and the comparison is performed on the first device after the first device receives the second code from the second device. For example, each actor device 154 generates a short code that uniquely identifies itself and displays the code on the display 156 of the actor device 154, e.g., displaying the word "safari" on the head mounted device 154, FIG. 5B. The code is also stored in the device ID field 266 and broadcasted upon request or automatically. In response to receiving the transmitted signal from one or more actor devices, the Director 102 via the director device 104 picks one or more actor devices to be paired with, stores one or more short codes in the device ID's 366. Each code for pairing is read by the Actor 152 and entered by the Director 102 into the director device 104 via the I/O device 108, e.g., entering the word "safari" via a virtual keyboard as illustrated in FIG. 5D. After the Director 102 enters the one or more codes, these codes are transmitted to the one or more actor devices 104 and compared with the device ID 266 stored on each actor device 154. Upon finding a match, the actor device 154 and director device 104 are paired.

In some implementations, the first code is a unique code generated (424) by the second device and transmitted to the first device for display, and the comparison is performed on the second device after receiving the second code from the second user. For example, the director device 104 generates a short code, and stores it as one of the identifiers for pairing in the device identifiers 366. In response to a request to transmit the code or without any request (e.g., periodically) the device 104 broadcasts the code. The actor device 154 nearby picks up the signal and displays the code in the HMD screen. After the Actor 152 reads the code to the Director 102 and the Director 102 enters the code, the code stored in the database 324 is retrieved and compared with the code entered on the director device 104. Upon finding a match, the devices are paired.

Systems and methods in accordance with the implementations described herein provide a greatly simplified approach to matching partners in an actor/director experience. The combination of Actor 152 and Director 102, plus the expected target audience, add a new wrinkle to and old problem. It is likely to be difficult for the Actor 152 to control a complex interface (such as typing in an IP address or server name), especially when the Actor 152 is a child, and thus even less likely to be adept at negotiating a network game UI. By displaying a short code and having the Actor 152 read the code to the Director 102 in accordance with some implementations, the Director 102 will have no problem in entering the short code, as the director device 104 often has keyboard facility (either on-screen as shown in FIG. 5D or physical), which permits easy entry of a handful of characters (e.g., "safari").

Referring back to the method 400, in FIG. 4B, after pairing with the first device, the second device synchronizes (426) the virtual game environment on the second device with the first device. In some implementations, the synchronization includes: (a) receiving a message from the second device requesting a change of an element in the virtual game environment (e.g., day/night); (b) when the first device receives the request, it is generally accepted, and the requested change is implemented at the first device; and (c) transmitting changes in the virtual game environment, including the element change, to the second device. In some instances, the network packet that includes the request from the director device is lost in transit. Because the request is lost, the requested change is not implemented at either the actor device or the director device, so the virtual environment continues to be displayed without the requested change. In some instances, the requested change is incompatible with the state of the VR world as seen by the Actor, in which case the requested change is rejected.

For example, further involving the Director 102 in the game, by using the on-screen UI available only on the director device 104, the Director 102 can change the environment. For example, the Director may request to change day to night using the day/night control 508 (FIG. 5F), trigger weather effects, send visual hints or pointers (e.g., by selecting an object to highlight, or touching an area of the map), give textual information or updates, choose mission targets or destinations (e.g., choose the three animals to be photographed as shown in FIG. 5A). The change requests, in some implementations, are transmitted to the actor device 154 as one or more messages and trigger one or more updates to the UI displayed on the actor device 154. In some implementations, these updates on the display of the actor device 154 are performed without input from the Actor user 152. For example, as the Director 102 toggles the day/night control 508, the sky displayed on the actor device 154 darkens or brightens. In some implementations, certain types of updates are implemented only after the Actor 152 accepts them. The results of the environment are reflected in the virtual environment on the actor device 154 and then mirrored to the director device 104 as the actor device 154 continuously transmits the changes and the director device 104 continuously receives updates of the simulation. As described in greater details below, the changes include any updates in the virtual environment on the actor device 154, such as movement of the Actor to explore the game. The Director's view as displayed on the director device 104 constantly receives updates and state synchronization data from the actor device 154, thus allowing the director device 104 to mirror the Actor's simulation on the actor device 154.

It is also possible for the Director's role to involve challenging the Actor 152, similar to a "dungeon master" in traditional table-top games. In this position, the Director 102 may be presented with more knowledge/information than the Actor 152, such as facts about the area, or its inhabitants, the ability to see the location of interactive features, a full map of the area, some sort of tactical or planning view. This allows the Director 102 to pose problems or give guidance as desired, feeding conversation and encouraging an active partnership between the players. These opportunities to inspire dialogue lend themselves particularly strongly to an educational context, where a parent or teacher is exposed to a wealth of information, which can be used to guide the experience of a child playing the game.

Figure 5F:
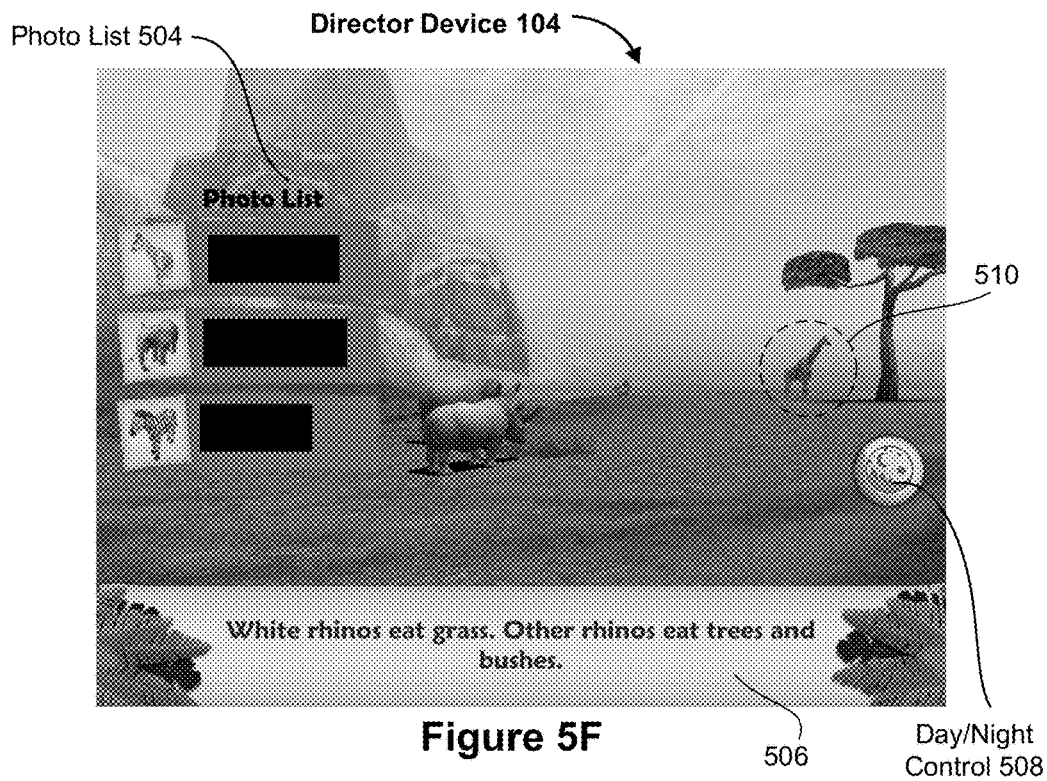
Figure 5G:
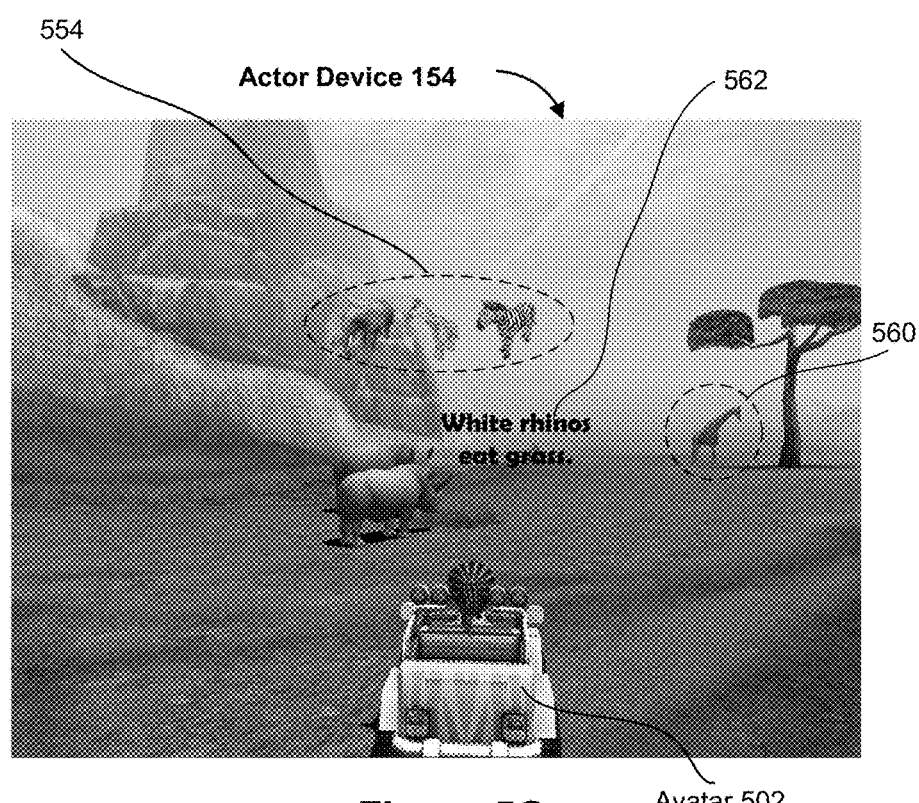

For example, in FIG. 5F, facts stored in the director controls 356 (e.g., the information 506 of "White rhinos eat grass. Other rhinos eat trees and bushes.") are available only in the UI of the director device 104. Assuming operation in close proximity, the Director 102 may simply talk (verbally, without technology) to the Actor 152 and give advice about finding these animals to photograph. One of the goals or features of the division in roles is to engender active discussion between the Actor 152 and the Director 102, with the Director 102 passing information (e.g., the facts about rhino 506 or the animals to be photographed together 504) or questions to the Actor 152, to aid the Actor 152 in his exploration of the game space, and potentially to further any educational outcomes/goals. In addition to the verbal communication, the Director 102 may also, through the UI of the director device 104, input a request to transmit the additional rhino information to the actor device 154. In accordance with the request, the additional information is packaged in a message and transmitted to the actor device 154. Upon receiving the message, the virtual game environment on the actor device 154 is changed to include the additional information 562 on the actor device 154, as illustrated in FIG. 5G.

The Director 102 can directly control interactive elements of the game world in order to challenge the Actor 152. Examples of this sort of interaction include: causing non-player characters (NPCs) to activate or appear (e.g., adding a giraffe to the active scene or moving a giraffe closer to the avatar 502), triggering puzzles to become active, changing landscape features (make a drawbridge rise or fall, open a locked door), or summoning a wave of enemies.

Referring back to the method 400, in FIG. 4B, the method 400 is performed at the second device (428), including pairing (430) with the first device that is in the actor mode of operation. In some implementations, the second device displays the virtual game environment that is shared from the first device by running a game application (e.g., the game application 322 on the director device 104). The device pairing is described above with reference to steps 420-424 above. After the device pairing, the second device displays (432) on the second display the virtual game environment and additional controls to configure the virtual game environment. The second device then receives (434), by the second display, a second user input from a second user of the second device on one of the additional controls to change an element in the virtual game environment. In response to receiving the second user input, the second device generates and transmits (436) a message requesting the change of the element from the second device to the first device.

For example, in FIG. 5F, by using the on-screen UI available only on the director device 104, the Director 102 can request to change the environment. For example, the Director can change day to night using the day/night control 508. The request is packaged in a message (e.g., including an element ID and a new property of the element). The message is then transmitted to the actor device 154. When the actor device 154 receives the request, the Actor's VR world is updated, and this is transmitted back to the Director's device 154. The results of the environment are reflected in the virtual environment on the actor device 154 and mirrored to the director device 104 as the director device 104 continuously receives updates of the simulation.

Referring back to the method 400, in FIG. 4C, in some implementations, synchronizing (438) the virtual game environment on the second device with the first device includes, at the first device (440): (a) identifying a first element in the virtual game environment to be synchronized and a second element in the virtual game environment to be synthesized; (b) detecting a first change to the first element; and (c) in response to detecting the first change of the first element, transmitting the first change from the first device to the second device without transmitting any changes to the second element. In some implementations, the first element corresponds (442) to a position of the first user and/or a view direction of the first user. In some implementations, the first element is stored (444) on the first device and the first change is detected by the first device. In some implementations, updating the first element in accordance with the first change received from the first device includes (446) first obtaining a view direction of the first user from the first device, followed by modifying the camera view by the first user's view direction.

Typically, players in a multiplayer game have the coordinates, animations, and other state information of other players' avatars transmitted to them, and expect to see representations of those players in their game world. Special attention is given to which elements of the game world are synchronized, and which are synthesized. It is advantageous to transmit and synchronize a player's position and derive the camera from this, rather than attempt to transmit the Actor's camera position exactly to the Director. This is then modified by what is known of the Actor's view direction from his HMD, resulting in a multi-layer model of the Actor's behavior, which can be used to give a view to the Director, which balances accuracy with a smooth continuity.

For example, in FIGS. 5F and 5G, the game environment includes a number of dynamic features. These dynamic features are synchronized at the initial connection and constantly thereafter. When more than one networked simulation model the same entity, one of them may be considered to be the authentic, original one. The properties of this, authoritative version, are transmitted to the other versions on the network, which attempt to remain in synchronization with the authoritative entity.

As used herein, a "synchronized" feature is where one device (typically the actor device 154) is considered to know, definitively (authoritatively) what state something is in, while all other devices (typically at least one of the director device) mirror the original. In other words, all other devices synchronize their version with the way the authoritative version defines itself. Thus, a position of authority stores the dynamic information and distributes the state of the game universe to other player devices.

Prior to the pairing, as shown in FIG. 5B, the avatar 502 is displayed in the game environment at an initial position. The initial position can be defined ahead of time, loaded and modelled identically on both instances of the game application 322 and 222, so that both the director device 104 and actor device 154 are starting in the same state on both systems. As the game progresses, the Actor's position and view direction changes. For example, the Actor 152 moves his head up, down, left, right, or tilts his head at some angle. The Actor's view direction has components in both the real world and the virtual world. In the virtual world, the Actor 152 has a position, e.g., moving a mannequin through space, or moving a front facing virtual vehicle 502 through a safari game world as shown in FIG. 5G. On top of this is an additional rotation describing the direction the Actor's head is pointing. The user position and the view direction are stored on the actor device 154, e.g., the user position 250 and view direction 252. The user position and/or the view direction are changes detected by the actor device 154 and transmitted to the director device 104 for synchronization.

In addition to synchronized features, some dynamic features are synthesized. When delivering an ideal user experience to two devices: one using an HMD, one using a tablet, some implementations compute the viewpoint from which the camera is rendered independently from both perspectives. Although both devices might compute the camera position using broadly similar information, they may use different algorithms and preferences, to achieve results which differ (maybe significantly) but are appropriate to each device.

As used herein, a "synthesized" feature is used when no device defines a true or authoritative version, and each device computes its own version of the feature from other data that is available. In such cases, being exactly (or closely) the same—or in synchronization—is either not essential, or indeed detrimental. The synthesized feature can be locally computed to balance accuracy with a smooth continuity.

In most cases, synchronization is preferable when giving multiple users the impression of sharing a world, which would be lost if they report seeing different things (e.g., one user sees three red cars and a first user sees two blue cars). In some cases, however, exceptions are made and a position or feature may be synthesized. For example, in FIGS. 5F and 5G, based on the user position as indicated by the avatar 502 and synchronized between the two devices, the director device 154 computes locally some dynamic features, such as the giraffe 510. The giraffe 510 displayed on the director device 104 is standing up straight; while the giraffe 560 displayed on the actor device 154 has its head down. This slight discrepancy is not essential, as the scene may quickly change to track the actor's position and/or view direction changes.

Referring now to the method 400 in FIG. 4C. In some implementations, the following operations occur (448) at the second device: the second device receives the first change of the first element from the first device, and in response to receiving the first change, the second device derives a camera view of the first user based on the first change. This includes (448) updating the first element in accordance with the first change received from the first device and computing the second element locally based on the first change of the first element. In some implementation, deriving the camera view of the first user based on the first change includes (450) fading out the camera view and fading in a new camera view reflecting the changes received by the first device.

In the actor/director model, the Actor's position, view and experience are continuous and considered authoritative. The Director 102 expects to see the same as the Actor 152, and problems occur when network issues arise. In a typical multiplayer game, it is relatively common to see situations in which a player's avatar "warps" or "pops" to a new position, because the transmission of the state is temporarily impeded by adverse network conditions. These problems are exaggerated significantly when it is expected that one's own viewpoint will mirror that of another party, and suddenly it moves in a huge leap. In such situations, the Director's received version of the camera view may skip wildly. Rather than have the Director see choppy footage, or attempt to "smooth" the viewpoint through infrequently-received snapshot positions, it is less jarring to simply fade out the director's view, briefly, then return it in a better condition.

The terminology used herein is for the purpose of describing particular implementations only and is not intended to be limiting of the invention. As used in the description and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations described herein were chosen and described in order to explain the principles of the invention and its practical applications, to thereby enable others skilled in the art to best utilize the invention and various implementations with various modifications as are suited to the particular use contemplated.

What is claimed is:

1. A computing system, comprising:
    a first device in an actor mode of operation, comprising:
        a first display;
        one or more first processors;
        first memory; and
        one or more first programs stored in the first memory and configured for execution by the one or more first processors, the one or more first programs comprising instructions for:
            displaying, on the first display, a virtual game environment shared with a second device in a director mode of operation;
            pairing with the second device and synchronizing the virtual game environment during the pairing; and
            after pairing with the second device, synchronizing the virtual game environment from the first device to the second device, including:
                receiving a visual hint from the second device requesting selection of an object in the virtual game environment, wherein the visual hint is displayed on the first display;
                selecting, by a first user of the first device, the object in the virtual game environment in response to receiving the visual hint; and
                transmitting changes in the virtual game environment, including the selection of the object, to the second device; and
    the second device in the director mode of operation, comprising:
        a second display;
        one or more second processors;
        second memory; and
        one or more second programs stored in the second memory and configured for execution by the one or more second processors, the one or more second programs comprising instructions for:
            pairing with the first device that is in the actor mode of operation;
            displaying on the second display the virtual game environment and additional controls to configure the virtual game environment;
            receiving, by the second display, a first user input from a second user of the second device on one of the additional controls to create the visual hint for the object in the virtual game environment;
            generating and transmitting, from the second device to the first device, the visual hint to select the object; and
            displaying on the second device an updated view of the virtual environment in response to the selection of the object at the first device.

2. The computing system of claim 1, wherein the first device includes a plurality of devices.

3. The computing system of claim 1, wherein the first device is a head mounted display (HMD).

4. The computing system of claim 1, wherein the second device includes a plurality of devices.

5. The computing system of claim 4, wherein a different view of the virtual game environment is displayed on each of the plurality of devices.

6. The computing system of claim 1, wherein prior to the pairing, the one or more first programs and the one or more second programs further comprise instructions for:
    loading independently static features in the virtual game environment.

7. The computing system of claim 1, wherein the pairing includes:
    displaying a first code on the first display to the first user;
    receiving from the second user a second code on the second device;
    comparing the first code with the second code; and
    in accordance with a determination that the first code matches the second code, establishing a direct communication between the second device and the first device.

8. The computing system of claim 7, wherein the first code is a unique code generated by the first device, and the comparison is performed on the first device after the first device receives the second code from the second device.

9. The computing system of claim 7, wherein the first code is a unique code generated by the second device and transmitted to the first device for display, and the comparison is performed on the second device after receiving the second code from the second user.

10. The computing system of claim 1, wherein synchronizing the virtual game environment from the first device to the second device includes:
    at the first device:
        identifying a first element in the virtual game environment to be synchronized and a second element in the virtual game environment to be synthesized;
        detecting a first change to the first element; and
        in response to detecting the first change of the first element, transmitting the first change from the first device to the second device without transmitting any changes to the second element; and at the second device:
  receiving the first change of the first element from the first device; and
  in response to receiving the first change of the first element from the first device, deriving a camera view of the first user based on the first change, including:
    updating the first element in accordance with the first change received from the first device; and
    computing the second element locally based on the first change of the first element.

11. The computing system of claim 10, wherein the first element corresponds to a position of the first user and/or a view direction of the first user.

12. The computing system of claim 10, wherein the first element is stored on the first device and the first change is detected by the first device.

13. The computing system of claim 10, wherein updating the first element in accordance with the first change received from the first device includes:
  obtaining a view direction of the first user from the first device; and
  modifying the camera view by the first user's view direction.

14. The computing system of claim 10, wherein deriving the camera view of the first user based on the first change includes:
  fading out the camera view and fading in a new camera view reflecting the changes received by the first device.

15. A non-transitory computer readable storage medium storing one or more programs configured for execution by a second device in a director mode of operation having a second display, one or more second processors and second memory and a first device in an actor mode of operation having a first display, one or more first processors and first memory:
  the one or more programs comprising instructions for, at the first device:
    displaying, on the first display, a virtual game environment shared with the second device;
    pairing with the second device and synchronizing the virtual game environment during the pairing; and
    after pairing with the second device, synchronizing the virtual game environment from the first device to the second device, including:
      receiving a visual hint from the second device requesting selection of an object in the virtual game environment, wherein the visual hint is displayed on the first display;
      selecting, by a first user of the first device, the object in the virtual game environment in response to receiving the visual hint; and
      transmitting changes in the virtual game environment, including the selection of the object, to the second device; and
  the one or more programs comprising instructions for, at the second device:
    pairing with the first device that is in the actor mode of operation;
    displaying on the second display the virtual game environment and additional controls to configure the virtual game environment;
    receiving, by the second display, a first user input from a second user of the second device on one of the additional controls to create the visual hint for the object in the virtual game environment;
    generating and transmitting, from the second device to the first device, the visual hint to select the object; and
    displaying on the second device an updated view of the virtual environment in response to the selection of the object at the first device.

16. A method for interacting with a virtual game environment in an actor/director model, comprising:
  at the first device in an actor mode of operation having a first display, one or more first processors and first memory storing one or more first programs configured for execution by the one or more first processors:
    displaying, on the first display, a virtual game environment shared with the second device;
    pairing with the second device and synchronizing the virtual game environment during the pairing; and
    after pairing with the second device, synchronizing the virtual game environment from the first device to the second device, including:
      receiving a visual hint from the second device requesting selection of an object in the virtual game environment, wherein the visual hint is displayed on the first display;
      selecting, by a first user of the first device, the object in the virtual game environment in response to receiving the visual hint; and
      transmitting changes in the virtual game environment, including the selection of the object, to the second device; and
  at the second device in the director mode of operation having a second display, one or more second processors and second memory storing one or more second programs configured for execution by the one or more second processors:
    pairing with the first device that is in the actor mode of operation;
    displaying on the second display the virtual game environment and additional controls to configure the virtual game environment;
    receiving, by the second display, a first user input from a second user of the second device on one of the additional controls to create the visual hint for the object in the virtual game environment;
    generating and transmitting, from the second device to the first device, the visual hint to select the object; and
    displaying on the second device an updated view of the virtual environment in response to the selection of the object at the first device.

* * * * *

UNITED STATES PATENT AND TRADEMARK OFFICE
CERTIFICATE OF CORRECTION

PATENT NO. : 10,235,965 B2
APPLICATION NO. : 15/460184
DATED : March 19, 2019
INVENTOR(S) : Leabman et al.

Page 1 of 1

It is certified that error appears in the above-identified patent and that said Letters Patent is hereby corrected as shown below:

In the Claims

Claim 16, Column 22, Line 18, please delete "at the first" and insert --at a first--;

Claim 16, Column 22, Line 23, please delete "with the second" and insert --with a second--.

Signed and Sealed this
Twenty-first Day of May, 2019

Andrei Iancu
*Director of the United States Patent and Trademark Office*